United States Patent [19]

Schwane et al.

[11] Patent Number: 5,276,077
[45] Date of Patent: Jan. 4, 1994

[54] IGNITION RESISTANT CARBONATE POLYMER BLENDS

[75] Inventors: Lisa M. Schwane, Lake Jackson, Tex.; M. Robert Christy, Midland, Mich.; Samuel A. Ogoe, Missouri City, Tex.

[73] Assignee: The Dow Chemical Company, Midland, Mich.

[21] Appl. No.: 893,188

[22] Filed: Jun. 3, 1992

[51] Int. Cl.$^5$ ......... C08K 5/5393; C08K 5/524/5/521
[52] U.S. Cl. .................................. 524/133; 524/135; 524/139; 524/141; 524/145; 524/147; 524/168; 524/169
[58] Field of Search ............... 524/169, 133, 135, 147, 168, 139, 141, 145

[56] References Cited

U.S. PATENT DOCUMENTS

| | | | |
|---|---|---|---|
| 4,218,357 | 8/1980 | Mark et al. | 524/168 |
| 4,254,015 | 3/1981 | Thomas et al. | |
| 4,463,130 | 7/1984 | Serini et al. | 525/67 |
| 4,486,560 | 12/1984 | Thomas . | |
| 4,532,284 | 7/1985 | Ogoe . | |
| 4,558,081 | 12/1985 | Thomas . | |
| 4,626,563 | 12/1986 | Ogoe et al. . | |
| 4,649,168 | 3/1987 | Kress et al. | 524/130 |
| 4,650,823 | 3/1987 | Krishnan et al. . | |
| 4,692,488 | 9/1987 | Kress et al. . | |
| 4,727,101 | 2/1988 | Ogoe et al. . | |
| 4,826,900 | 5/1989 | Ogoe et al. . | |
| 4,837,258 | 6/1989 | Laughner et al. . | |
| 4,914,144 | 4/1990 | Muehlbach et al. . | |
| 4,925,891 | 5/1990 | Kress et al. . | |
| 4,927,870 | 5/1990 | Ogoe et al. . | |
| 4,931,503 | 6/1990 | Boutni et al. | 525/67 |
| 5,041,479 | 8/1991 | Ogoe . | |
| 5,061,745 | 10/1991 | Wittmann et al. . | |

FOREIGN PATENT DOCUMENTS

| | | |
|---|---|---|
| 146023 | 6/1985 | European Pat. Off. . |
| 173856 | 3/1986 | European Pat. Off. . |
| 173869 | 3/1986 | European Pat. Off. . |
| 226922 | 7/1987 | European Pat. Off. . |
| 0363608 | 4/1990 | European Pat. Off. . |
| 3444867 | 5/1986 | Fed. Rep. of Germany . |

OTHER PUBLICATIONS

Encyclopedia of Polymer Science and Engineering, vol. 7, Fibers, Optical to Hydrogenation John Wiley & Sons.

Primary Examiner—Veronica P. Hoke

[57] ABSTRACT

According to the present invention there are obtained improved ignition resistant carbonate polymer blends having unexpectedly better combinations of toughness, ignition resistance, processability and stability. In particular the blend comprises a major amount of carbonate polymer, a minor amount of a rubber-modified monovinylidene aromatic copolymer, and an optional rubbery core/shell graft copolymer impact modifier. As ignition resistance additives the blends contain a metal salt of an aromatic sulfur compound, a buffering aromatic sulfur compound, an organophosphorus compound, and a tetrafluoroethylene polymer.

13 Claims, No Drawings

IGNITION RESISTANT CARBONATE POLYMER BLENDS

The present invention relates to an impact resistant and ignition resistant composition based on a major portion of a carbonate polymer, a minor portion of a rubber-modified monovinylidene aromatic copolymer, and an optional amount of a rubbery core/shell graft copolymer impact modifier. In these resin blends, excellent combinations of properties have been obtained using as the ignition resistance additives a metal salt of an aromatic sulfur compound, a buffering free aromatic sulfur compound, an organophosphorus compound and a tetrafluoroethylene polymer.

It is well known that blends of a carbonate polymer and a monovinylidene aromatic copolymer, such as an ABS-type resin, can be prepared possessing desirable combinations of physical properties. These thermoplastic polymer blends are suitable for the manufacture of molded parts wherein impact strength, rigidity, toughness, heat resistance, and excellent electrical properties are required. However, it is usually desired to incorporate sufficient ignition resisting additives in such blends to enable the resin blend compositions to obtain the V-0 rating (1.62 millimeter or 1/16 inch samples) or 5V rating (3.18 millimeter or ⅛ inch samples) in the well known Underwriters Laboratory test referred to as UL 94.

In this regard, however, it has unfortunately been found that there are various disadvantages or tradeoffs that are observed when attempting to incorporate sufficient amounts of many of the known ignition resisting additives. Often one or more of the additives is found to cause degradation of one of the polymeric components, especially the carbonate polymer. In addition, if large amounts of the additive are required, the desirable physical properties of the resin blend are diluted by the typically undesirable physical properties of the additive compound. Moreover, some additives have chemical characteristics and/or processing characteristics that result in poor performance of the resin blend or parts prepared from the resin blend in one or more aspects in the broad range of applications and processing equipment types wherein these types of resins can be employed.

There have already been numerous efforts, as indicated in the literatures to provide ignition resistant carbonate polymer blends which are essentially halogen-free. Early efforts to provide halogen-free ignition resistant carbonate polymers or carbonate polymer blends have typically failed to provide sufficient combinations of ignition resistance, toughness, processability, and stability. See for example U.S. Pat. No. 4,927,870, U.S. Pat. No. 4,914,144, U.S. Pat. No. 4,692,488, U.S. Pat. No. 4,837,258, EP 146,023, EP 173,869, and EP 226,922.

It is also known from U.S. Pat. No. 4,532,284 that aromatic sulfimide metal salts, and metal sulfates or bisulfates having a pKa from 1 to 5 are useful to render carbonate polymers ignition resistant. In U.S. Pat. No. 4,727,101 it is disclosed that aromatic sulfur compound metal salts, free aromatic sulfimide compounds, monomeric or polymeric halogenated aromatic compounds and fibril forming polytetrafluoroethylene (PTFE) are used to provide stabilized, ignition resistant carbonate polymers. It is known from U.S. Pat. No. 4,626,563 that aromatic sulfimide metal salts, monomeric or polymeric halogenated aromatic compounds, metal salts of inorganic acids having a pKa from 1 to 5, and fibril forming polytetrafluoroethylene are useful to render carbonate polymers ignition resistant or flame retardant. Other flame retardant additives are known from and listed in U.S. Pat. No. 4,650,823. These patents are incorporated by reference herein.

In U.S. Pat. No. 5,061,745 ignition resistant blends are prepared based on halogen-free polycarbonates, graft copolymers, phosphorus compounds and tetrafluoroethylene polymers. These composition are asserted to provide combinations of toughness, resistance to stress crazing and flame resistance without any halogen and metal compounds. It has unfortunately been found, however, that these types of compositions do not consistently pass the stringent UL-94 (5VA) rating test although individual samples of these types of compositions will sometimes pass in some testing labs. It would therefore be desirable if there were compositions of this type which would possess improved ignition resistance as measured by the Limiting Oxygen level ignition resistance test and consistently reduced burning times according to the UL-94 (5VA) standard.

SUMMARY OF THE INVENTION

According to the present invention there are obtained improved ignition resistant carbonate polymer blends having unexpectedly better combinations of toughness, ignition resistance, processability, aesthetics and stability. These blends are obtained by the selection of specific ignition resistance additives and careful avoidance of other known additives that have detrimental effects.

In particular, in one embodiment, the present invention is an ignition resistant and impact resistant polymer resin comprising a polymer blend of: (a) from about 65 to about 98 weight percent carbonate polymer, (b) from about 1 to about 25 percent by weight rubber-modified monovinylidene aromatic copolymer, and (c) from 0 to about 10 percent by weight of a rubbery core/shell graft copolymer impact modifier, the weight percentages of components (a), (b), and (e) being based upon the weights of components (a), (b) and (c), which blend contains as ignition resistance additives: (d) a metal salt of an aromatic sulfur compound, (e) a free aromatic sulfur compound, (f) from about 2 to about 15 percent by weight of an organophosphorus compound, and (g) from 0.01 to about 2 percent by weight of a tetrafluoroethylene polymer, the weight percentages of (f) and (g) based upon the weights of components (a), (b), (c), (d), (e), (f) and (g). Preferably the blend comprises from about 0.001 to about 0.5 percent by weight metal salt of an aromatic sulfur compound (d) and from about 0.001 to about 0.5 percent by weight free aromatic sulfur compound (e), the weight percentages of (d) and (e) based upon the weights of components (a), (b), (c), (d), (e), (f) and (g).

In a preferred aspect, the metal salt of an aromatic sulfur compound is selected from the group of aromatic sulfonates, aromatic sulfates, aromatic sulfonamides, and aromatic sulfimides; preferably the aromatic sulfimides represented by the formula

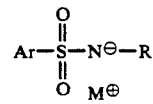

wherein Ar is an aromatic group, M is a metal cation, R is carbonyl, arylcarbonyl, arylaminocarbonyl, aralkylaminocarbonyl, or arylsulfonyl.

In a more preferred aspect, the free aromatic sulfur compound of the compositions of the present invention is a free aromatic sulfimide having a pKa in the range from about 1 to about 3, more preferably represented by the formula

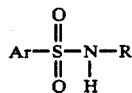

wherein Ar is an aromatic group, R is carbonyl, arylcarbonyl, arylaminocarbonyl, aralkylaminocarbonyl, or arylsulfonyl.

In a further embodiment, in the ignition resistant and impact resistant polymer resins according to the invention, the rubber-modified monovinylidene aromatic copolymer is prepared by the solution or bulk polymerization of monovinylidene aromatic monomer and comonomer in the presence of the selected polymer rubber and an optional solvent or diluent, simultaneously preparing monovinylidene aromatic copolymer grafted to the rubber component and any desired amount of ungrafted matrix phase monovinylidene aromatic copolymer. More preferably, the monovinylidene aromatic copolymer consists essentially of styrene and acrylonitrile comonomers polymerized in the presence of butadiene polymer rubber and an optional solvent or diluent. In another alternative embodiment, the present invention is a molded article prepared from the improved resins as described herein.

It should be noted that these compositions preferably contain as additives substantially no metal salts of inorganic acids (such as inorganic metal sulfates or bisulfates), halogen-containing (bromine or chlorine) additives, antimony or bismuth additive compounds, meaning no amounts of these compounds that would have a deleterious effect on the resin blend physical properties or resistance to ultra-violet radiation, or lead to degradation of the carbonate polymer molecular weight. Generally, this means less than about 2 weight percent, preferably less than 1 weight percent, more preferably less than 0.1 weight percent, and most preferably no measurable amount. it is noted that although additives of the types mentioned are intended to be excluded, there can still be very small quantities of impurities in one or more of the components, such as chlorine at levels on the order of 10 parts per million in the polycarbonates, in the compositions according to the invention. It is also noted that the fluorine content of tetrafluoroethylene polymers is not considered to be an unacceptable halogen for these purposes.

DETAILED DESCRIPTION OF THE INVENTION

The halogen-free, thermoplastic aromatic carbonate polymers suitable for use in this invention are well known in the literature and can be prepared by known techniques. In general the carbonate polymers can be prepared from one or more halogen-free multihydric compounds by reacting the multihydric compounds such as a diphenol, with a carbonate precursor such as phosgene, a haloformate or a carbonate ester such as diphenyl or dimethyl carbonate. Preferred diphenols are 2,2-bis(4-hydroxyphenyl)-propane and bishydroxyphenylfluorene.

The carbonate polymers can be prepared from these raw materials by any of several known processes such as the known interfacial, solution or melt processes. As is well known, suitable chain terminators and/or branching agents can be employed to obtain the desired molecular weights and branching degrees. As used herein, the term "halogen-free polycarbonate" is intended to mean polycarbonates based on halogen-free diphenols, halogen-free terminators and halogen-free branching agents, if such branching agents are used.

It is understood, of course, that the polycarbonate may be derived from (1) two or more different dihydric phenols or (2) a dihydric phenol and a glycol or a hydroxy- or acid-terminated polyester or a dibasic acid in the event a carbonate copolymer or heteropolymer rather than a homopolymer is desired. Also suitable for the practice of this invention are blends of any one of the above carbonate polymers. Also included in the term carbonate polymer are the ester/carbonate copolymers.

In general, the carbonate polymer is employed in amounts to maintain the desired physical properties of the resin blend compositions, including their heat resistance and toughness. The carbonate polymer is typically incorporated into the blend of the present invention in amounts of at least about 65 weight percent, preferably at least about 70 weight percent, more preferably at least about 75 weight percent and most preferably at least about 80 weight percent. In order to maintain the resin blend physical properties the carbonate polymer is typically incorporated into the blend of the present invention in amounts up to and including about 99 weight percent, preferably 98.5 weight percent, more preferably 98 weight percent and most preferably 97 weight percent based on total weight of the carbonate polymer, rubber-modified monovinylidene aromatic polymer, and rubbery core/shell graft copolymer impact modifier.

The rubber-modified monovinylidene aromatic copolymers suitably employed according to the present invention include copolymers of monovinylidene aromatic monomers, especially styrene, with one or more additional unsaturated, copolymerizable monomers, particularly the ethylenically unsaturated nitrile monomers (such as acrylonitrile and/or methacrylonitrile), maleic anhydride, alkyl methacrylate, N-substituted maleimide or other polymerizable comonomers. Rubber-modified copolymers of the monovinylidene aromatic and ethylenically unsaturated nitrile monomers such as acrylonitrile and/or methacrylonitrile are particularly preferred. It is especially preferred to employ a butadiene polymer rubber-modified copolymer of monovinylidene aromatic and ethylenically unsaturated nitrile monomers such as acrylonitrile and/or methacrylonitrile. Such copolymers are herein collectively referred to as ABS-type resins, referring to the use of acrylonitrile, butadiene and styrene or the equivalent of one or more of these.

Preferred ABS-type resins are characterized by comprising a matrix phase of the monovinylidene aromatic copolymer having dispersed therein one or more particulate rubber phase, which rubber is preferably grafted with a compatibilizing amount of the same or different monovinylidene aromatic copolymer. Preferably, the rubber-modified monovinylidene aromatic copolymers comprise at least 5 percent by weight rubber, more preferably at least 10 percent by weight rubber, based on the weight of rubber-modified monovinylidene aromatic copolymers and not including the weight of the grafted compatibilizing monovinylidene aromatic copolymer in the rubber weight. The presence of a significant amount of an ungrafted matrix phase of monovinylidene aromatic copolymer (from about 50 to about 95, preferably from about 60 to about 90 weight percent based on weight rubber-modified monovinylidene aromatic copolymer) distinguishes these compositions from the rubbery core/shell graft copolymer impact modifiers discussed below. ABS-type resins typically have a glass transition temperature (Tg) of greater than 0° C., generally greater than 20° C., preferably greater than 60° C., which Tg is dictated by the matrix phase polymer.

Preferred rubber-modified monovinylidene aromatic copolymer resins are those prepared by the solution or bulk polymerization of monovinylidene aromatic monomer and comonomer in the presence of the selected polymer rubber and an optional solvent or diluent, preferably simultaneously preparing monovinylidene aromatic copolymer grafted to the rubber component and any desired amount of ungrafted matrix phase monovinylidene aromatic copolymer. Preferred rubber-modified monovinylidene aromatic copolymer resins of this type are the ABS-type resins prepared by the solution or bulk polymerization of styrene and acrylonitrile comonomers in the presence of butadiene polymer rubber and an optional solvent or diluent.

Alternatively, rubber-modified monovinylidene aromatic copolymer resins, such as ABS resins, may be prepared by mixing together previously prepared polymer components prepared by like or different methods. Examples of this technique would include combination of matrix monovinylidene aromatic copolymer, comprising (meth)acrylonitrile and/or other optional comonomer(s), with separately prepared latices comprising rubbery graft copolymers such as styrene/acrylonitrile grafted polybutadiene rubber or styrene/butadiene copolymer rubber latices. In addition to polybutadiene or styrene/butadiene copolymer rubbers other suitable rubbers include the well known copolymers of ethylene and propylene optionally containing copolymerizable nonconjugated dienes (known as EPDM rubbers), polyacrylates such as polybutylacrylate and mixtures of the foregoing rubbers.

In general, the monovinylidene aromatic copolymer is employed in amounts to improve the processability of the blend composition and maintain the desired physical properties. The monovinylidene aromatic copolymer is typically incorporated into the blend of the present invention in amounts of at least about 1 weight percent, preferably at least about 1.5 weight percent, more preferably at least about 2 weight percent and most preferably at least about 2.5 weight percent. In order to maintain the resin blend physical properties the monovinylidene aromatic copolymer is typically incorporated into the blend of the present invention in amounts up to and including about 30 weight percent, preferably 20 weight percent, more preferably 10 weight percent and most preferably 7 weight percent based on total weight of the carbonate polymer, monovinylidene aromatic copolymer, and rubbery core/shell graft copolymer impact modifier.

Suitable rubbery core/shell graft copolymer impact modifiers which may optionally be incorporated into the resin blend of the present invention consist of at least 50 percent by weight, preferably greater than 50 percent by weight, and most preferably at least 60 percent by weight rubbery polymer. Such materials should have a glass transition temperature (Tg) of less than −20° C., which Tg is dictated primarily by the rubbery polymer and not significantly impacted by the grafted portion. Examples of these materials include the grafted butadiene and acrylate polymer rubbers particularly those having a core-shell structure. The preferred rubbery core/shell graft copolymer impact modifiers are the grafted butadiene polymer rubbers having polymers of styrene and methylmethacrylate graft polymerized thereto. These are known in the art as MBS graft copolymers.

If employed, the optional rubbery core/shell graft copolymer impact modifier is preferably utilized in amounts necessary to obtain the desired degree of impact resistance. If used, the rubbery core/shell graft copolymer impact modifier is typically incorporated into the blend of the present invention in amounts of up to and including about 10 weight percent, preferably 8 weight percent, and most preferably 5 weight percent based on total weight of the carbonate polymer, monovinylidene aromatic copolymer, and rubbery core/shell graft copolymer impact modifier. In order to provide the desired resin blend physical properties the rubbery core/shell graft copolymer impact modifier is typically incorporated into the blend of the present invention in amounts of at least about 0.5 weight percent, preferably at least about 1 weight percent and more preferably at least about 2 weight percent.

The metal salts of aromatic sulfur compounds used herein include metal salts of aromatic sulfonates, aromatic sulfates, aromatic sulfonamides, and aromatic sulfimides. Suitable metals are the metals of Groups I and IIA of the Periodic Chart. The preferred metal is an alkali metal such as sodium or potassium. The metal salts of aromatic sulfur compounds used herein are further illustrated by the formula

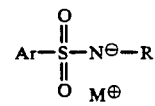

wherein Ar is an aromatic group, M is a metal cation, R is carbonyl, arylcarbonyl, arylaminocarbonyl, aralkylaminocarbonyl, or arylsulfonyl. Specific examples of these R groups are benzoyl, benzylaminocarbonyl and tolylsulfonyl groups.

The preferred group of aromatic sulfur compounds are sulfimides having the formula:

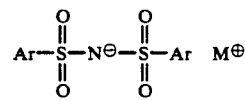

wherein Ar is an aromatic group and M is a metal cation.

Examples of the sulfimide salts are the alkali metal salts of saccharin, N-(p-tolylsulfonyl)-p-toluene sulfimide, N-(N'-benzylaminocarbonyl)sulfanilimide, N-(phenylcarboxyl)-sulfanilimide, N-(2-pyrimidinyl)-sulfanilimide, and N-(2-thiazolyl)sulfanilimide. These salts and similar ones are disclosed in U.S. Pat. No. 4,254,015 which is incorporated herein by reference.

In general, the aromatic sulfur compound metal salt is employed in amounts to improve the ignition resistance of the blend composition and maintain as much as possible the desired physical properties. The aromatic sulfur compound metal salt is typically incorporated into the blend of the present invention in amounts of at least about 0.001 weight percent, preferably at least about 0.005 weight percent and most preferably at least about 0.01 weight percent based on the weight of all of the composition components (carbonate polymer, rubber-modified monovinylidene aromatic copolymer, optional rubbery core/shell graft copolymer impact modifier, aromatic sulfur compound metal salt, free aromatic sulfur compound, organophosphorus compound, and tetrafluoroethylene polymer). In order to maintain the resin blend physical properties the aromatic sulfur compound metal salt is typically incorporated into the blend of the present invention in amounts up to and including about 0.5 weight percent, preferably 0.2 weight percent and most preferably 0.1 weight percent based on total weight of all of the composition components.

In order to stabilize the resulting compositions containing the generally basic metal salts of the aromatic sulfur compounds, it is desirable to include compounds that provide a buffering effect. According to the present invention, this is done by adding an effective amount of an acid or "free" form of one or more of the aromatic sulfur compounds as mentioned above. The free aromatic sulfur compounds useful in combination with the metal salts in this invention are those having a pKa in the range from about 1 to about 3. Due to the excellent buffering effect that they provide, and particularly when employing a metal salt of an aromatic sulfimide, it may be desirable to incorporate the free aromatic sulfimides in combination with the metal salts. The free aromatic sulfimides optionally useful in combination with the metal salts in this invention are those having a pKa in the range from about 1 to about 3. They are illustrated by the formula:

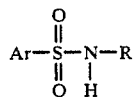

wherein Ar is an aromatic group, R is carbonyl, arylcarbonyl, arylaminocarbonyl, aralkylaminocarbonyl, or arylsulfonyl. Specific examples of these R groups are benzoyl, benzylaminocarbonyl and tolylsulfonyl groups. Examples of such free aromatic sulfimides are saccharin, N-(p-tolylsulfonyl)-p-toluene sulfimide, N-(N'-benzylaminocarbonyl)sulfanilimide, N-(phenyl-carboxyl)-sulfanilimide, N-(2-pyrimidinyl)-sulfanilimide, and N-(2-thiazolyl)sulfanilimide. A preferred free aromatic sulfimide for use in combination with potassium N-(p-tolylsulfonyl)-p-toluene sulfimide (KPTSM) is the corresponding free sulfimide, N-(p-tolyl-sulfonyl)-p-toluene sulfimide (HPTSM).

In general, the free aromatic sulfur compound is employed in amounts to improve the ignition resistance of the blend composition and maintain as much as possible the desired physical properties. The free aromatic sulfur compound is typically incorporated into the blend of the present invention in amounts of at least about 0.001 weight percent, preferably at least about 0.005 weight percent and most preferably at least about 0.01 weight percent based on the weight of all of the composition components (carbonate polymer, rubber-modified monovinylidene aromatic copolymer, optional rubbery core/shell graft copolymer impact modifier, aromatic sulfur compound, free aromatic sulfur compound, organophosphorus compound, and tetrafluoroethylene polymer). In order to maintain the resin blend physical properties the free aromatic sulfur compound is typically incorporated into the blend of the present invention in amounts up to and including about 0.5 weight percent, preferably 0.2 weight percent and most preferably 0.1 weight percent based on total weight of all of the composition components.

As mentioned, the compositions of this invention employ an organophosphorous compound to increase the ignition resistance. Suitable organophosphorous compounds are those which include the organophosphates, the organophosphonites, the organophosphines, the organophosphites and the polyphosphates. Preferred organophosphorus compounds are those polyphosphates having repeating units represented by the formulae I and II and the organophosphorus compounds represented by the formulae III through X:

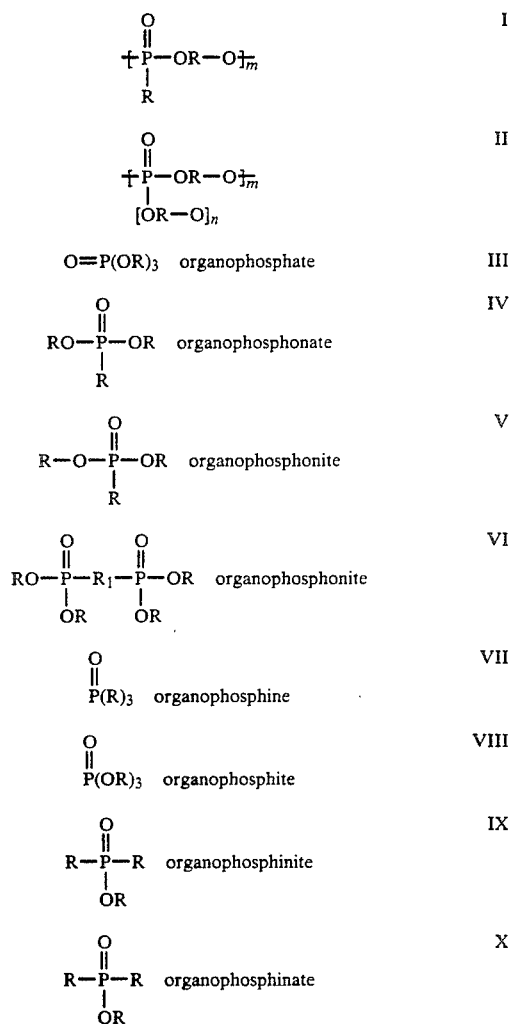

wherein m=2 to 100, n=1 to 100; R is independently hydrogen, an unsubstituted or substituted aryl, alkyl, cycloalkyl, aralkyl, or alkaryl radical containing one or more carbon atoms. The preferred organophosphorous compound is triphenylphosphate. Suitable organophosphorus compositions are disclosed, for example, in U.S.

Pat. Nos. 4,066,611; 4,073,769; 4,076,686; 4,088,709; 4,427,813; and 4,254,014, which are incorporated by reference herein. Suitable polyphosphate compositions according to formula II are disclosed, for example, in U.S. Pat. No. 4,463,130, which is incorporated by reference herein.

In general, the organophosphorus compound is employed in amounts to improve the ignition resistance of the blend composition and maintain as much as possible the desired physical properties. The organophosphorus compound is typically incorporated into the blend of the present invention in amounts of at least about 2 weight percent, preferably at least about 4 weight percent and most preferably at least about 6 weight percent based on the weight of all of the composition components (carbonate polymer, rubber-modified monovinylidene aromatic copolymer, optional rubbery core/shell graft copolymer impact modifier, aromatic sulfur compound, free aromatic sulfur compound, organophosphorus compound, and tetrafluoroethylene polymer). In order to maintain the resin blend physical properties the organophosphorus compound is typically incorporated into the blend of the present invention in amounts up to and including about 15 weight percent, preferably 12 weight percent and most preferably 10 weight percent based on total weight of all of the composition components.

Suitable tetrafluoroethylene polymers for use in this invention are those adapted to form a fibril structure to reduce the tendency of the polymer to drip under molten conditions. Such polymers are often referred to as PTFE or Teflon and are generally disclosed for example by U.S. Pat. Nos. 3,005,795; 3,671,487 and 4,463,130, incorporated by reference herein. Most desirably the tetrafluoroethylene polymers have a high elastic memory. Some examples of tetrafluoroethylene polymers that have high elastic memory include Teflon TM 6C, 60, 64, 6CN, 65 and 67.

In general, the tetrafluoroethylene polymer is employed in amounts to improve the ignition resistance of the blend composition and maintain as much as possible the desired physical properties. The tetrafluoroethylene polymer is typically incorporated into the blend of the present invention in amounts of at least about 0.01 weight percent and preferably at least about 0.02 weight percent based on the weight of all of the composition components (carbonate polymer, rubber-modified monovinylidene aromatic copolymer, optional rubbery core/shell graft copolymer impact modifier, aromatic sulfur compound, free aromatic sulfur compound, organophosphorus compound, and tetrafluoroethylene polymer). In order to maintain the resin blend physical properties the tetrafluoroethylene polymer is typically incorporated into the blend of the present invention in amounts up to and including about 2 weight percent and preferably 1 weight percent based on total weight of all of the composition components.

The carbonate polymer compositions of the present invention are suitably prepared by combining the ingredients in effective amounts using any of a variety of blending procedures conventionally employed for polymer blends of this type. For example, a teflon component in emulsion form can be preblended with an emulsion of one or more of the other components, such as the monovinylidene aromatic copolymer and/or the rubbery core/shell graft copolymer impact modifier, prior to combining with the remaining components and the resulting blend further melt blended. Dry particulate components can be combined in various sequences such as: simultaneous combining and dry blending of fine particulates of the components and additives; initial combination of a fine teflon particulate with a fine particulate form of one or more of the other components, such as the carbonate polymer or halogenated epoxy compound, followed by combination with the remaining components/additives; or dry blending a fine particulate teflon with a premixed dry blend of the other components.

The combining of the dry particulates is then typically followed by further melt blending and extrusion steps to form resin pellets. The subsequent melt blending and/or melt processing temperature(s) are desirably limited to temperatures less than 325° C., preferably less than 300° C. and more preferably less than 290° C.

These resins are very useful in the production of a range of molded articles such as enclosures and/or internal structural parts for consumer and business electronic devices such as computers, printers, copiers, televisions, calculators and the like. The blends of carbonate and ABS-type polymers according to the present invention can also be employed in mixtures, alloys or blends with other polymer resins, including mixtures with polyester.

In addition to the mentioned fire retardant additives, other additives can be included in the carbonate polymer composition of the present invention such as antistatic agents, fillers (i.e. glass fibers), pigments, dyes, antioxidants, heat stabilizers, ultraviolet light absorbers, mold release agents and other additives commonly employed in carbonate polymer compositions.

EXPERIMENTS

The following Experiments are given to further illustrate the invention and should not be construed as limiting its scope. In the following Experiments, all parts and percentages are by weight unless otherwise indicated.

The melt flow rate of the polycarbonate resins were measured according to ASTM D-1238, condition "I". The notched Izod impact resistance is tested according to ASTM D-256-72A on on 3.18 millimeter (⅛ inch) samples that have been injection molded at 270° C. The results ("N. Izod") are given in foot pounds per inch (ft lb/in) with the results in Joules per meter (J/m) being given in parentheses.

The resistance to ignition of the polymer compositions is shown by the 5V UL-94 tests on 3.18 millimeter (⅛ inch) samples.

The resistance to ignition is also shown by the Limiting Oxygen Index (LOI) test performed according to ASTM D 2863-87. The results of the LOI test are given in "percent oxygen", with the higher values indicating better ignition resistance by virtue of requiring a higher concentration of oxygen to be present in order to support the burning of the sample.

A series of ignition resistant blends is prepared by combining the following components:

(a) Carbonate Polymer—A heat stabilized polycarbonate resin having a melt flow of 22 (CALIBRE ® 300 available from The Dow Chemical Company).

(b) Rubber-modified monovinylidene aromatic copolymer—A mass (solution) polymerized, butadiene rubber-modified copolymer of styrene and acrylonitrile containing about 12 weight percent rubber and about 16 weight percent acrylonitrile, having styrene-acrylonitrile copolymer grafted to the rubber component and an ungrafted monovinylidene aromatic copolymer content in the range of about 75% (±5%) by weight.

of the ignition resistance and impact resistance testing of these blends are shown in Table II below.

TABLE I

| | Blend Compositions | | | | | | | |
|---|---|---|---|---|---|---|---|---|
| | Blend Compositions in wt parts (and wt %'s) | | | | | | | |
| | Polymer Components Weight parts | | | IR Additives (wt % based on a + b + c + d + e + f + g) | | | | |
| | (wt % based on a + b + c) | | | (d) Metal Salt | | (e) HPTSM Buffer | (f) TPP | (g) PTFE |
| Comp. No. | (a) PC | (b) ABS | (c) MBS | type | amnt | | | |
| 1* | 3460 (94) | 100 (2.7) | 120 (3.3) | — | — | — | 300 (7.5) | 20 (0.5) |
| 2* | 3458 (94.1) | 98 (2.7) | 120 (3.3) | KPTSM | 4 (0.1) | — | 300 (7.5) | 20 (0.5) |
| 3* | 3458 (94.1) | 98 (2.7) | 120 (3.3) | KPTSM/ KHSO$_4$ | 2 (0.05)/ 2 (0.05) | — | 300 (7.5) | 20 (0.5) |
| 4* | 3456 (94.1) | 96 (2.6) | 120 (3.3) | KPTSM/ KHSO$_4$ | 4 (0.1)/ 4 (0.1) | — | 300 (7.5) | 20 (0.5) |
| 5 | 3456 (94.1) | 96 (2.6) | 120 (3.3) | KPTSM | 4 (0.1) | 4 (0.1) | 300 (7.5) | 20 (0.5) |
| 6 | 3458 (94.1) | 98 (2.7) | 120 (3.3) | KPTSM | 2 (0.05) | 2 (0.05) | 300 (7.5) | 20 (0.5) |

*Control Experiment, not an example of the present invention.

(c) Rubbery core/shell graft copolymer impact modifier—Butadiene rubber grafted with styrene and methylmethacrylate polymer, commercially available as Paraloid TM 8967 from Rohm & Haas, having a Tg of about −60° C., and containing about 70 percent by weight polybutadiene and substantially no ungrafted styrene and/or methylmethacrylate polymer.

(d) Metal salt compounds—
(1) An aromatic sulfur compound metal salt, potassium paratolylsulfimide (KPTSM) represented by the formula:

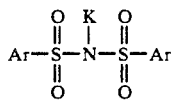

wherein Ar is a paratolyl group
(2) Potassium bisulfate (KHSO$_4$), an inorganic metal salt, as a comparative example.
(e) Free aromatic sulfur compound—free paratolylsulfimide (HPTSM) represented by the formula:

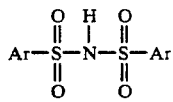

wherein Ar is a paratolyl group.
(f) Organophosphorus Compound—triphenyl phosphate (TPP).
(g) Tetrafluoroethylene polymer—Commercially available Teflon TM 6C powder from du Pont Chemical Company.

The Teflon was added to a preblended mixture of the other components, followed by dry blending for an additional six minutes then extrusion into pellets using a twin screw extruder at 230° C. barrel temperature. The extruded pellets are dried in an air draft of 100° C. for 4 hours. The resulting extruded dried pellets are injection molded into test bars for testing of ignition resistance and impact properties. The compositions of the various experimental compositions, in terms of the component amounts, are summarized in Table I below. The results

TABLE II

| | Blend Properties | | | | |
|---|---|---|---|---|---|
| | | | UL 94 Rating | | |
| Blend Comp. No. | Metal Salt/ Buffer | MFR (grams/ 10 Min.) | Izod$^a$ | 5V$^b$ | Avg burn time (sec)$^c$ | LOI$^e$ |
| 1* | none | 10.6 | 11.8 (637) | Pass/ Fail$^d$ | 11.3 | 29.7 |
| 2* | KPTSM | 11.3 | 10.8 (584) | Pass/ Fail$^d$ | 14.4 | 29.1 |
| 3* | KPTSM KHSO$_4$ | 11.5 | 12.4 (670) | Pass/ Fail$^d$ | 6.3 | 28.2 |
| 4* | KPTSM KHSO$_4$ | 11.2 | 12.8 (691) | Pass/ Fail$^d$ | 8.3 | 27.4 |
| 5 | KPTSM/ HPTSM | 10.8 | 12.0 (648) | Pass | 5.2 | 32.2 |
| 6 | KPTSM/ HPTSM | 11 | 10.9 (589) | Pass | 3.2 | 31.4 |

*Control Experiment, not an example of the present invention.
$^a$Izod Impact at room temperature, 23° C. (73° F.), in ft lb/in and (J/m).
$^b$5V results measured on 3.18 millimeter (⅛ inch) samples
$^c$Measured during the UL 94 testing procedure
$^d$Passed in one evaluation but samples of same composition failed in second evaluation at different location.
$^e$Limiting Oxygen Index The above results indicate that the presence of the combination of the metal salt of an aromatic sulfur compound in combination with the free aromatic sulfur compound buffering agent in the above resin blend provided improved combinations of properties compared to the use of no metal salt compound (1*), compared to the use of the aromatic sulfur compound metal salt without the buffering agent (2*), and compared to the use of inorganic metal salt compounds (3* and 4*). As can be seen, the sulfur compound metal salt/buffering agent combination surprisingly improved polymer properties, particularly the combination of ignition resistance and color, while maintaining the notched Izod impact resistance and processability (MFR) of the blend.

What is claimed is:
1. An ignition resistant and impact resistant polymer resin comprising a polymer blend of:
(a) from about 65 to about 99 weight percent carbonate polymer,
(b) from about 1 to about 25 percent by weight of a rubber-modified monovinylidene aromatic copolymer impact modifier,

(c) from 0 to about 10 percent by weight of a rubbery core/shell graft copolymer impact modifier, the weight percentages of components (a), (b), and (c) being based upon the weights of components (a), (b) and (c), which blend contains as ignition resistance additives:

(d) a metal salt of an aromatic sulfimide compound, (e) a free aromatic sulfimide compound, (f) from about 2 to about 15 percent by weight of an organophosphorus compound selected from the group consisting of organophosphates, organophosphonites, organophosphines, organophosphites, and polyphosphates, and (g) from 0.01 to about 2 percent by weight of a tetrafluoroethylene polymer, the weight percentages of (f) and (g) based upon the weights of components (a), (b), (c), (d), (e), (f) and (g).

2. An ignition resistant and impact resistant polymer resin according to claim 1 comprising:

(d) from about 0.001 to about 0.5 percent by weight of a metal salt of an aromatic sulfimide compounds, and (e) from about 0.001 to about 0.5 percent by weight of a free aromatic sulfimide compound, the weight percentages of (d) and (e) based upon the weights of components (a), (b), (c), (d), (e), (f) and (g).

3. An ignition resistant and impact resistant polymer resin according to claim 1 wherein the metal salt of an aromatic sulfur compound is represented by the formula

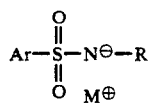

wherein Ar is an aromatic group, M is a metal cation, R is carbonyl, arylcarbonyl, arylaminocarbonyl, aralkylaminocarbonyl, or arylsulfonyl.

4. An ignition resistant impact resistant polymer resin according to claim 1 wherein the metal salt of an aromatic sulfur compound is represented by the formula

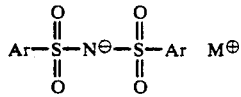

wherein Ar is an aromatic group and M is a metal cation.

5. An ignition resistant and impact resistant polymer resin according to claim 1 wherein the metal salt of an aromatic sulfur compound is selected from the group consisting of alkali metal salts of saccharin, N-(p-tolylsulfonyl)-p-toluene sulfimide, N-(N'-benzylaminocarbonyl)sulfanilimide, N-(phenylcarboxyl)-sulfanilimide, N-(2-pyrimidinyl)-sulfanilimide, and N-(2-zolyl)sulfanilimide.

6. An ignition resistant and impact resistant polymer resin according to claim 1 wherein the free aromatic sulfimide has a pKa in the range from about 1 to about 3.

7. An ignition resistant an impact resistant polymer resin according to claim 1 wherein the free aromatic sulfimide is represented by the formula

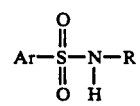

wherein Ar is an aromatic group, R is carbonyl, arylcarbonyl, arylaminocarbonyl, aralkylaminocarbonyl, or arylsulfonyl.

8. An ignition resistant and impact resistant polymer resin according to claim wherein the free aromatic sulfimide is hydrogen N-(p-tolylsulfonyl)-p-toluene sulfimide (HPTSM).

9. An ignition resistant and impact resistant polymer resin according to claim 1 containing substantially no halogen-containing additives.

10. An ignition resistant and impact resistant polymer resin according to claim 1 containing substantially no inorganic metal sulfates or bisulfates.

11. An ignition resistant and impact resistant polymer resin according to claim 1 wherein the monovinylidene aromatic copolymer is prepared by the solution or bulk polymerization of monovinylidene aromatic monomer and comonomer in the presence of the selected polymer rubber and an optional solvent or diluent, simultaneously preparing monovinylidene aromatic copolymer grafted to the rubber component and any desired amount of ungrafted matrix phase monovinylidene aromatic copolymer.

12. An ignition resistant and impact resistant polymer resin according to claim 1 wherein the monovinylidene aromatic copolymer consists essentially of styrene and acrylonitrile comonomers polymerized in the presence of butadiene polymer rubber and an optional solvent or diluent.

13. A molded article prepared from the resin according to claim 1.

* * * * *

UNITED STATES PATENT AND TRADEMARK OFFICE
CERTIFICATE OF CORRECTION

PATENT NO. : 5,276,077

DATED : January 4, 1994

INVENTOR(S) : Schwane et al.

It is certified that error appears in the above-identified patent and that said Letters Patent is hereby corrected as shown below:

Claim 1, col. 12, lines 67 and 68, "rubber-modified monovinylidene aromatic copolymer impact modifier," should correctly read --rubber-modified monovinylidene aromatic copolymer,--.

Claim 4, col. 13, line 40, "ignition resistant impact resistant" should correctly read --ignition resistant and impact resistant--.

Claim 7, col. 14, line 11, "ignition resistant impact resistant" should correctly read --ignition resistant and impact resistant--.

Claim 8, col. 14, line 25, "according to claim wherein" should correctly read --according to claim 7 wherein--.

Signed and Sealed this

Eighth Day of August, 1995

Attest:

BRUCE LEHMAN

Attesting Officer     Commissioner of Patents and Trademarks